United States Patent [19]

Kaiser et al.

[11] 4,056,343

[45] Nov. 1, 1977

[54] APPARATUS FOR CONTINUOUSLY PRODUCING RAISED MARKS ON PLASTIC CABLE JACKETS

[75] Inventors: Hans Kaiser, Ditzingen; Ernst Konnerth; Gert Kramer, both of Stuttgart, all of Germany

[73] Assignee: International Standard Electric Corporation, New York, N.Y.

[21] Appl. No.: 660,299

[22] Filed: Feb. 23, 1976

[30] Foreign Application Priority Data

Mar. 1, 1975 Germany .............................. 2509027

[51] Int. Cl.² .............................................. B29C 25/00
[52] U.S. Cl. ...................................... 425/112; 101/74; 264/132; 425/327
[58] Field of Search .................. 101/18, 74, 23, 401.1, 101/37, 76, 77; 118/312, 405; 427/21; 106/31; 33/129; 100/170; 425/127, 129 R, 328, 110, 112, 385, 113, 114, 327, 324 R, 811; 264/132, 272

[56] References Cited

U.S. PATENT DOCUMENTS

| | | | |
|---|---|---|---|
| 1,677,927 | 7/1928 | Pettee | 101/74 X |
| 2,303,458 | 12/1942 | Hermann et al. | 118/312 X |
| 2,867,001 | 1/1959 | Lewis et al. | 425/324 X |
| 3,184,793 | 5/1965 | Plourde | 425/328 X |
| 3,739,717 | 6/1973 | Brown et al. | 101/37 |

FOREIGN PATENT DOCUMENTS

| | | | |
|---|---|---|---|
| 7,341,164 | 9/1975 | Germany | 425/327 |
| 1,257,769 | 12/1971 | United Kingdom | 425/324 R |

Primary Examiner—Richard B. Lazarus
Assistant Examiner—Mark Rosenbaum
Attorney, Agent, or Firm—John T. O'Halloran; Thomas M. Marshall

[57] ABSTRACT

The apparatus for producing raised markings on a cable's plastic jacket disclosed provides for at least one drum shaped marking member, which may be driven by the cable itself or, if there are a pair of such drums, at least one is driven by means of a stepper motor which is controlled synchronously with the cable take-off speed. The drums are vertically adjustable and mounted on swivel arms carried on a carriage. Pneumatic means are employed to force the drum or drums against the moving cable with a predetermined pressure. Depressions corresponding to the desired markings are formed in the circumferential surface of the drum. As the drum or drums rotate a powder filled container or filling head is pressed against them so that powder is picked up in the depressions and carried by the drums into contact with the cable. When the powder filled depression area of the drum contacts the cable, which is still hot, the powder will fuse with the material of the cable's jacket and form a raised marking. The depressions may be symbols, letters, numerical length marks and the like.

5 Claims, 9 Drawing Figures

APPARATUS FOR CONTINUOUSLY PRODUCING RAISED MARKS ON PLASTIC CABLE JACKETS

BACKGROUND OF THE INVENTION

1. Field of the Invention

Cable marking apparatus.

2. Prior Art

The subject matter of this application is basically an improvement on German Petty Pat. No. 7,341,164. The disclosure of that German patent is hereby incorporated by reference.

There have been many attempts to provide for equipment to mark the sheath or jacket of cables none of which have been completely satisfactory. Included in those prior efforts are the following U.S. Pat. Nos.

1,677,927 Pettee
2,168,431 Olson
2,898,848 Gillies et al.
3,143,062 Rankin et al.
3,578,766 Diolot
3,633,544 Weiler
3,739,717 Brown et al.
3,899,999 Christ et al.

SUMMARY OF THE INVENTION

The device of this invention improves upon the aforementioned German patent in several important respects. To begin with the device utilized to supply the powder to the depressions in the marking drum or wheel is greatly improved to provide for powder recirculation and a positive pneumatic driven air feed for the powder. Additionally, the carriage on which the drums' swivelling arms are carried contains a large supply of the marking powder which is pneumatically agitated and utilizes a pneumatic system for transporting the powder from the supply to the filling head adjacent to and in contact with the marking drums.

Additional improvements include the provision for a stepper motor drive for at least one of the drums which is synchronously controlled by a separate device, as described in co-pending application Ser. No. 658,215, Ansberg, et al. 1—1, assigned to the assignee of this invention.

The device of this invention is carried by a carriage which is mounted on lockable wheels so that it can be positioned directly behind the extruder as the plastic jacket is being formed on a cable core. The arms which carry the marking drum or drums are vertically adjustable and a pneumatic cylinder forces the drums against the cable with a controlled pressure.

The filling heads are connected via two pipes to the powder supply container carried in the carriage and swivel. Means are employed to supply a mechanical prestress to a portion of the filling heads so that it bears against the surface of the marking drum in a controlled manner to uniformly fill the depressions in the drum's surface.

DESCRIPTION OF THE PREFERRED EMBODIMENTS

Figure 1:
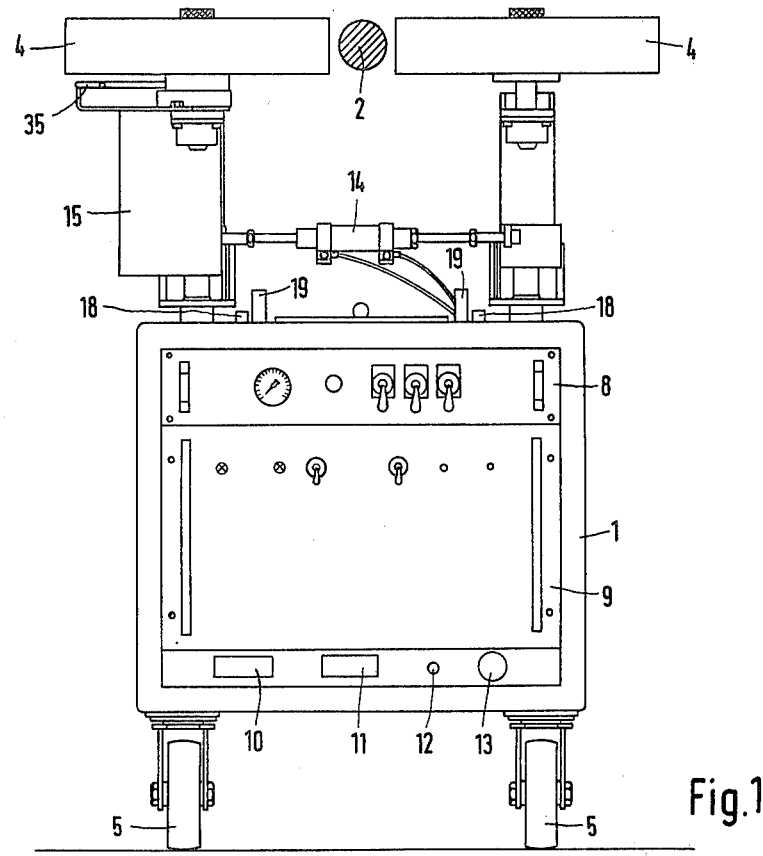
FIG. 1 is a front view of the apparatus of this invention.
Figure 2:
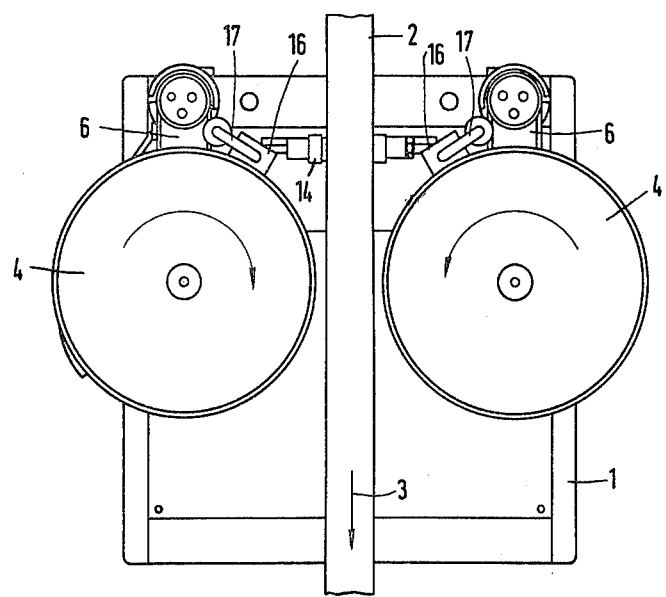
FIG. 2 is a top view of the apparatus of this invention.

Referring to FIGS. 1 and 2, a carriage 1, mounted on lockable wheels 5 carries marking drums 4 which are vertically adjustably mounted on swivelling arms 6. The drums 4 are provided along their circumference with marks or depressions corresponding to the outlines of the desired cable marking. When the device of this invention is utilized to mark the running length of the cable with length marks one of the drums 4 may be provided with a mark or depression which will automatically apply a running length mark, for example one meter, to the sheath or jacket of the cable. In addition one of the drums 4 may also contain a counting mechanism which automatically advances after each revolution of that drum 4. Such a device is described in detail in connection with FIGS. 8 and 9 below.

In addition to the electrical and mechanical components necessary for the operation of the device of this invention, the carriage 1 also includes two plug in units 8, 9 which contain the control, switching and indicating elements of the electrical and pneumatic units. Below the plug in unit 9, two plug sockets 10 and 11 for multiple plugs are provided to which signal generators (not shown) controlling the movement of the drums 4 synchronously with the take-off speed are connected to the circuits via cables (not shown). A compressed air connection 12 is provided along with a power plug 13. Prior to the device of this invention being put into operation, the carriage 1 is positioned so that the cable 2 being taken off in the direction arrow 3 runs between the drums 4. During the operation of the device of this invention, in other words when one or both sides of the cable's jacket are being provided with raised marks and/or meter markings, a pneumatic linear drive 14 is pressurized so that drums 4 are forced against the surface of the cable 2 with a given pressure and are caused to rotate by their contact with the cable in the direction of the arrows on drums 4 shown in FIG. 2.

This manner of driving the drums 4 would be sufficient for a number of applications, but under certain operating conditions the drums 4 may have a cable braking effect on the sheath whereby the peripheral speed of the drum 4 and the take-off speed of the cable 2 are no longer in synchronism. This may result in undue stress on the still hot, and therefore soft, cable jacket which would cause an intolerable inaccuracy of the running length marking. Therefore, it is preferable for at least one of the drums 4 to be driven by a stepper motor 15. Preferably that same drum contains the counting mechanism to be described below.

The stepper motor 15 is controlled by signal generators (not shown) which are arranged at a point spaced from the device of this invention along the longitudinal moving cable where a control signal corresponding exactly to the cables take-off speed can be picked up. The generators (not shown) are connected via cables (not shown) to the carriage 1 and are coupled to the plug sockets 10 and 11.

Figure 3:
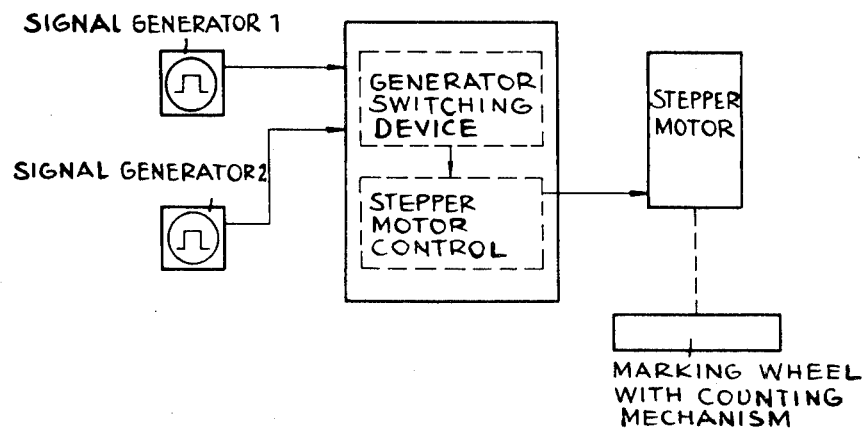
FIG. 3 is a block diagram illustrating the manner of driving the stepper motor which in turn drives at least one of the marking drums in synchronism with the take-off speed of the cable.

The control of the stepper motor 15 is illustrated in FIG. 3. A pair of signal generators are connected to the electronic stepper motor control through a generator switching device. The generator switching device contains an electronic circuit which, in accordance with a predetermined preselected mode of operation automatically applies one of the signals from one of the generators to the stepper motor control at the instant when both signals are in phase so that the stepper motor runs in a jerk free and non-braking manner. For further details relating to this portion of the device, reference is made to co-pending application Ser. No. 658,215, (Ansberg, et al. 1—1), which is assigned to the assignee of this invention.

Returning to FIG. 2 it will be seen that a filling head 16 is associated with each of the drums 4. The filling heads 16, are pivoted on lever 17 and bear against the circumferential surface of the drums 4 under a spring pressure. The filling heads 16 are connected via hose lines (not shown) with pipe connections 18, 19 which are the ends of pipes extending into the powder container 27 as will be described in detail below.

Figure 4:
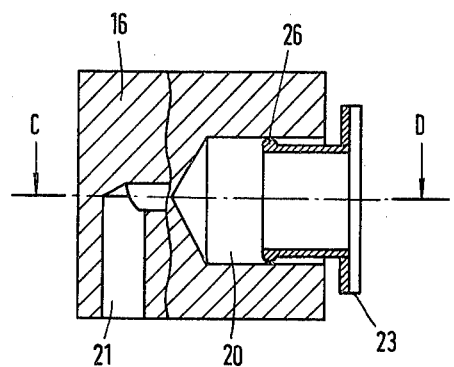
FIG. 4 is a cross sectional view of the filler head taken on the line A-B of FIG. 5.
Figure 5:
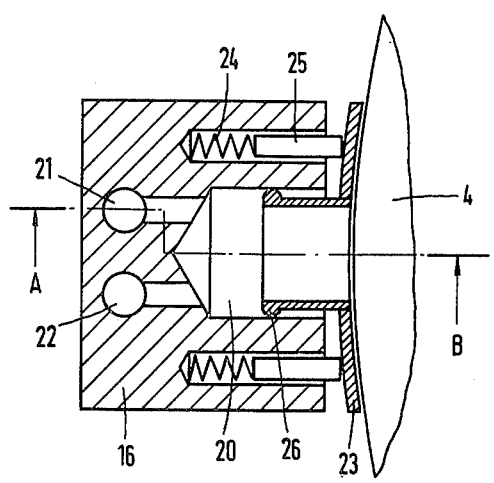
FIG. 5 is a cross sectional view of the filling head taken along the line C-D of FIG. 4.

Referring now to FIGS. 4 and 5, which illustrate details of the filling heads 16, it will be seen that each filling head 16 consists of a rectangular parallelepiped shaped block having a blind hole 20 into which pipes 21 and 22 end. Inserted in the blind hole 20 is a seal 23 which bears against the drum 4 on one side and is yieldingly supported on the other side by means of the pins 25. Springs 24 urge pins 25 outwardly so as to push the seal 23 against the surface of the drum 4. The cylindrical portion of the seal 23 in blind hole 20 is sealed by means of shoulder 26 on seal 23.

Figures 6, 7:
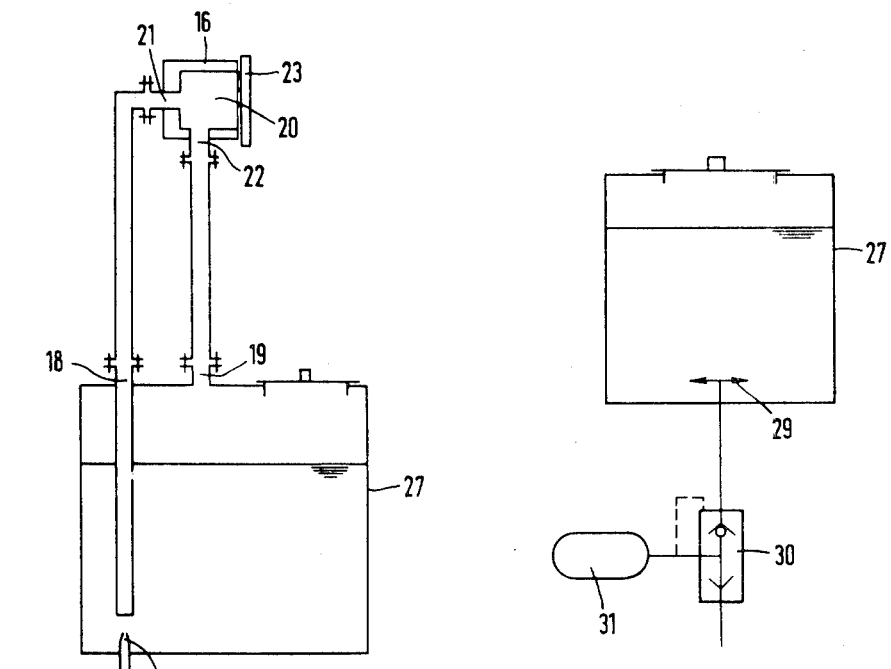
FIG. 6 is a schematic representation of the supply system for the colored plastic powder to the filling head.
FIG. 7 is a further schematic representation of a device for keeping the powder supply agitated.

FIG. 6 illustrates how the powder, preferably a different color than the material of the cable's jacket, is supplied to the filling head. The carriage 1 contains a powder container 27 which is filled to a predetermined level with plastic powder from which the raised marks are to be produced on the cable jacket. As previously mentioned before the pipe 18 is immersed in the powder and the lower end of pipe 18 is adjacent the compressed air line 28. The pipe 19 ends above the powder level in the powder container 27. As the compressed air emerges from the compressed-air line 28, the blind hole 20 is kept filled with an air powder mixture by constant circulation and the depressions of the circumferential surface of the drums 4 are filled with powder as described in the aforementioned German Petty Pat. No. 7,341,164. It has been found in operation that the powder which is used does not flow well and it has proved advantageous to provide for means to ensure that the powder in the powder container is always in a loose condition. The additional apparatus illustrated in FIG. 7 is for that purpose. It consists of a pipe 29 with open ends below the powder level and near the bottom of the powder container 27. The pipe 29 is connected to air hydraulic accumulator 31 through a rapid air relief valve 30. By utilizing this arrangement a compressed air pulse is sent discontinuously at regular intervals into the powder in the powder container 27 which prevents the powder from solidifying in the container 27.

Figure 8:
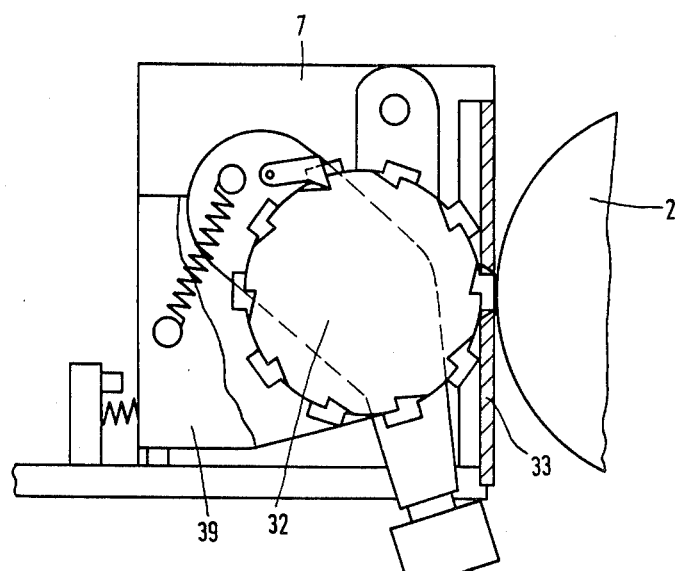
FIG. 8 is a top view of the counting mechanism utilized in the device of this invention in its operating position.
Figure 9:
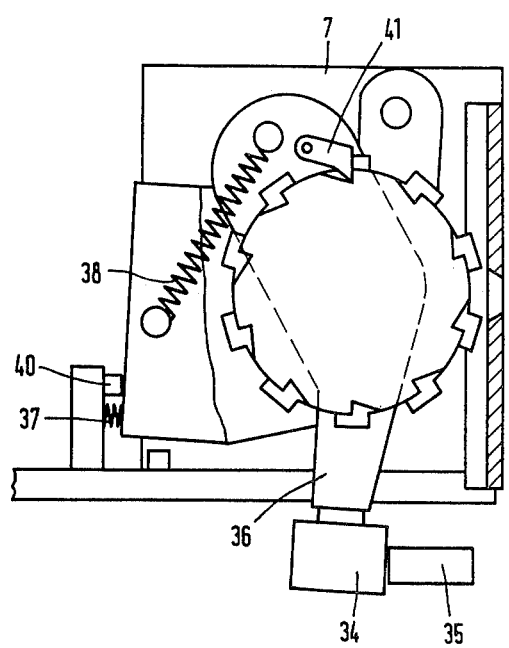
FIG. 9 shows the device illustrated in FIG. 8 in its switching position.

FIGS. 8 and 9 show the basic structure and operation of the counting mechanism installed in at least one of the drums 4 which is utilized for producing the length marks on the cable jacket. FIGS. 8 and 9 correspond roughly to a view into the drum 4 at the point where a number wheel 32 is located on whose circumference there are numerals. It will be understood that to produce mutli-digit length information on the cable jacket several such number wheels are arranged side by side. For purposes of illustration it is assumed that the number wheel 32 shown in FIGS. 8 and 9 is the wheel producing the digits in the units place and that it is advanced by one number in each revolution of the drum 4.

In FIG. 8 the counting mechanism is in the operating position or in other words the position in which the mark corresponding to a given length is applied to the cable in jacket 2. One of the numbers on number wheel 32 has been moved into an opening in the mask 33 which rests against cable 32. As the drum 4 advances, the cam roller 34 moves into engagement with the link 35. The link 35 is also shown in FIG. 1.

The link 35 moves the cam roller 34 more and more to the left as shown in FIG. 9. The lever 36 and the number wheel 32 are mounted on the same pivot point. Compression spring 37 which is much softer than the tension spring 38 is acted on. Therefore, at the beginning of the rotary motion of the lever 36 caused by the link 35, the compression spring 37 is first compressed until the housing 39 of the counting mechanism hits the stop 40 with the number wheel 32 being moved away from the mask 33. Only then does tension spring 38 stretch, and this results in relative movement between lever 36 and the number wheel 32 to cause the pawl to advance the number wheel 32 by one number.

While the device of this invention has been described in connection with the Figures, it will be appreciated that modifications may be made without departing from the scope of the appended claims.

We claim:

1. Improvements of an apparatus in tandem with an extruder comprising apparatus for continuously producing raised marks on plastic cable jackets disposed in the immediate vicinity of said extruder producing the cable jacket having in combination:

at least one rotatable drum disposed on one side of the cable emerging from the extruder with its circumferential surface coming into contact with the cable surface, said drum having marks or depressions on its circumferential surface corresponding to the outlines of the marks, an automatic advancing counting mechanism associated with said drum for forming length markings on said drum's circumferential surface with a powder container associated with the circumferential surface of said drum and having an outlet bearing on the surface of the drum in the area of the marks characterized by the combination of:

means operatively associated with said at least one drum for driving said at least one of said drums including a stepper motor controlled synchronously with the cable take-off speed;

means mounting said at least one drum so as to be vertically adjustable on swivel arms, said swivel arms being mounted on a movable carriage having means for locking the elements associated with and allowing said carriage to be movable;

said carriage including a supply of plastic powder and pipe means interconnecting said powder supply to said container; and said container being pivotably mounted and positioned in the area of the marks on the surface of said drum and having biasing means operatively associated with said container for causing said outlet to bear against said drum's surface with a preselected pressure.

2. The apparatus according to claim 1, wherein said container comprises a filling head formed from a rectangular parallelepiped-shaped block having its side adjacent said drum provided with a wide blind hole, a pair of powder and air supply pipes connecting the wide blind hole at its lowest point, a seal inserted in said filling head block's blind hole comprising a cylindrical tube and bent disc, means operatively associated with said seal for urging said bent disc portion of said seal against the drum including pins extending into narrow blind holes containing springs under compression.

3. The apparatus in accordance with claim 1, wherein one of the supply pipes for the powder extends into the powder in said powder supply so that its opening is below the surface of the powder but above the bottom of the powder supply, a compressed air line positioned in said powder supply which ends adjacent the lower end of said supply pipe and said other pipe terminates in said powder supply container above the powder level.

4. The apparatus in accordance with claim 3 further including an agitator pipe connected to an air hydraulic accumulator through a rapid air relief valve positioned adjacent the bottom of the powder supply below the powder level to maintain said powder in said powder supply in a loose condition.

5. The apparatus in accordance with claim 1 wherein said counting mechanism carried in one of said drums has numbers thereon which are embraced by a mask, means for pivoting said counting mechanism out of the mask and advancing it comprising a level projecting from said drum which bears on a link during each revolution of said drum whereby during the filling of the depressions in said drum surface with powder said counting mechanism is in a position to cause the marking of said cable jacket and during the revolution of said drum said number area of said counting mechanism is moved out of said mask and said counting mechanism advances one step.

* * * * *